United States Patent [19]

Ford

[11] Patent Number: 5,292,437
[45] Date of Patent: Mar. 8, 1994

[54] MULTILAYER FRUSTOCONICAL FILTER STRUCTURE

[75] Inventor: David F. Ford, Springfield, Ill.

[73] Assignee: Bunn-O-Matic Corporation, Springfield, Ill.

[21] Appl. No.: 947,466

[22] Filed: Sep. 21, 1992

[51] Int. Cl.⁵ .................. B01D 27/04; B01D 29/13
[52] U.S. Cl. .................. 210/478; 210/482;
210/497.3; 210/498; 210/499; 29/163.8; 29/902
[58] Field of Search .......... 210/474, 232, 477, 238,
210/478, 479, 481, 482, 498, 499, 494.1, 494.2,
497.3; 55/DIG. 5; 29/163.8, 902

[56] References Cited

U.S. PATENT DOCUMENTS

| | | |
|---|---|---|
| 3,333,964 | 8/1967 | Bender . |
| 3,374,897 | 3/1968 | Martin . |
| 4,221,670 | 9/1980 | Ziemek ............... 210/474 |
| 4,271,024 | 6/1981 | Kawolics et al. .......... 210/474 |
| 4,694,737 | 9/1987 | Wittlinger . |
| 5,134,925 | 8/1992 | Bunn et al. . |

Primary Examiner—Robert A. Dawson
Assistant Examiner—W. L. Walker
Attorney, Agent, or Firm—Trexler, Bushnell, Giangiorgi & Blackstone, Lt

[57] ABSTRACT

A reusable multilayer filter for use with a beverage brewing apparatus. The multilayer filter includes a foraminous support player, a porous mesh layer and a multiplicity of wrinkles formed in the porous mesh layer. The foraminous support layer has a multiplicity of spaced apart holes extending through the layer. The porous mesh layer overlies and is attached to the foraminous support layer. The mesh layer is formed of a woven, etched, or deposited material which has a multiplicity of small openings extending therethrough. The openings in the porous mesh layer are smaller than the holes in the foraminous support layer for selectively retaining material having a dimension larger than the openings. The wrinkles in the porous mesh layer are formed in spaced apart areas which are defined by a perimeter of the holes in the foraminous support layer. The wrinkles increase the effective surface area of the filter. A method of forming the filter includes providing a support layer material which is generally rigid, and a flexible mesh layer material. The mesh material is attached to the support layer material traversing the holes. The support layer material with the attached mesh layer is then deformed to form a desired concaved filter shape. A multiplicity of wrinkles are formed in the mesh layer within the perimeters of the holes.

12 Claims, 2 Drawing Sheets

MULTILAYER FRUSTOCONICAL FILTER STRUCTURE

BACKGROUND OF THE INVENTION

The present invention relates to filters for beverage brewing apparatus and more particularly to multilayer reusable filters for an automatic beverage brewing apparatus.

Various forms of beverage brewing apparatus are available. For example, there are manual apparatus as well as automatic apparatus. A typical beverage brewing apparatus, regardless of whether it is automatic or manual, infuses a brewing substance with a quantity of heated water. The brewing substance is retained in a filter and the infusing water is introduced and allowed to seep through the brewing substance and drain through the filter material. It is desirable to provide a filter material which is reusable, promotes consistent brewing and is easily cleaned.

One way to promote consistent brewing is to provide increased surface area to promote a predetermined metering of the infusion water through the filter material. A variety of filters have been produced which increase the surface area, most notably, corrugated paper filters. Corrugated paper filters have a pleated or folded surrounding edge to increase the surface area of the filter material. Such filters, however, are disposable and must be changed with each brewing cycle. A variety of reusable filters have been designed including a mesh material, which is woven, etched, or plated, and retained in a supporting structure.

A problem arises with the reusable filters since they are usually formed of a thin mesh material which is not conducive to the substantial flexing used to form the corrugated paper filters. As such, the reusable mesh filters typically do not maximize the surface area in the same manner as do the disposable filters.

In an automatic beverage brewing apparatus, a disposable filter has drawbacks since the purpose of the automatic brewing device is to minimize or eliminate the manual steps and the human interaction in the brewing process. Heretofore, a reusable filter for an automatic beverage brewing device has not been known to include a filter structure with an increased surface area.

OBJECTS AND SUMMARY OF THE INVENTION

A general object of the present invention is to provide a filter for use with a beverage brewing apparatus which is reusable and increases the surface area of the filter compared to the general shape of the filter.

Another object of the present invention is to provide a method of forming a reusable filter having an increased surface area.

Yet another object of the present invention is to provide a multilayer reusable filter for use with an automatic beverage brewing apparatus which has an increased surface area and is easily cleaned.

Briefly, and in accordance with the foregoing, the present invention comprises a multilayer reusable filter for use with a beverage brewing apparatus. The multilayer reusable filter includes a foraminous support layer, a porous mesh layer and a multiplicity of wrinkles formed in the porous mesh layer. The foraminous support layer has a multiplicity of spaced apart holes extending through the layer. The porous mesh layer overlies and is attached to the foraminous support layer. The mesh layer is formed of a woven, etched, or deposited material which has a multiplicity of small openings extending therethrough. The openings in the porous mesh layer are smaller than the holes in the foraminous support layer for selectively retaining beverage brewing substances which are larger than the openings. The wrinkles in the porous mesh layer are formed in spaced apart areas which are defined by a perimeter of the holes in the foraminous support layer. The wrinkles increase the effective surface area of the filter.

The method of the present invention includes providing a support layer material which is generally rigid, and a porous mesh layer material. The mesh layer is attached to the support layer material over the holes. The support layer material with the attached mesh layer is then deformed to form a desired filter shape. A multiplicity of wrinkles are formed in the mesh layer within the perimeter of the holes.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE ILLUSTRATED EMBODIMENT

Figure 1:
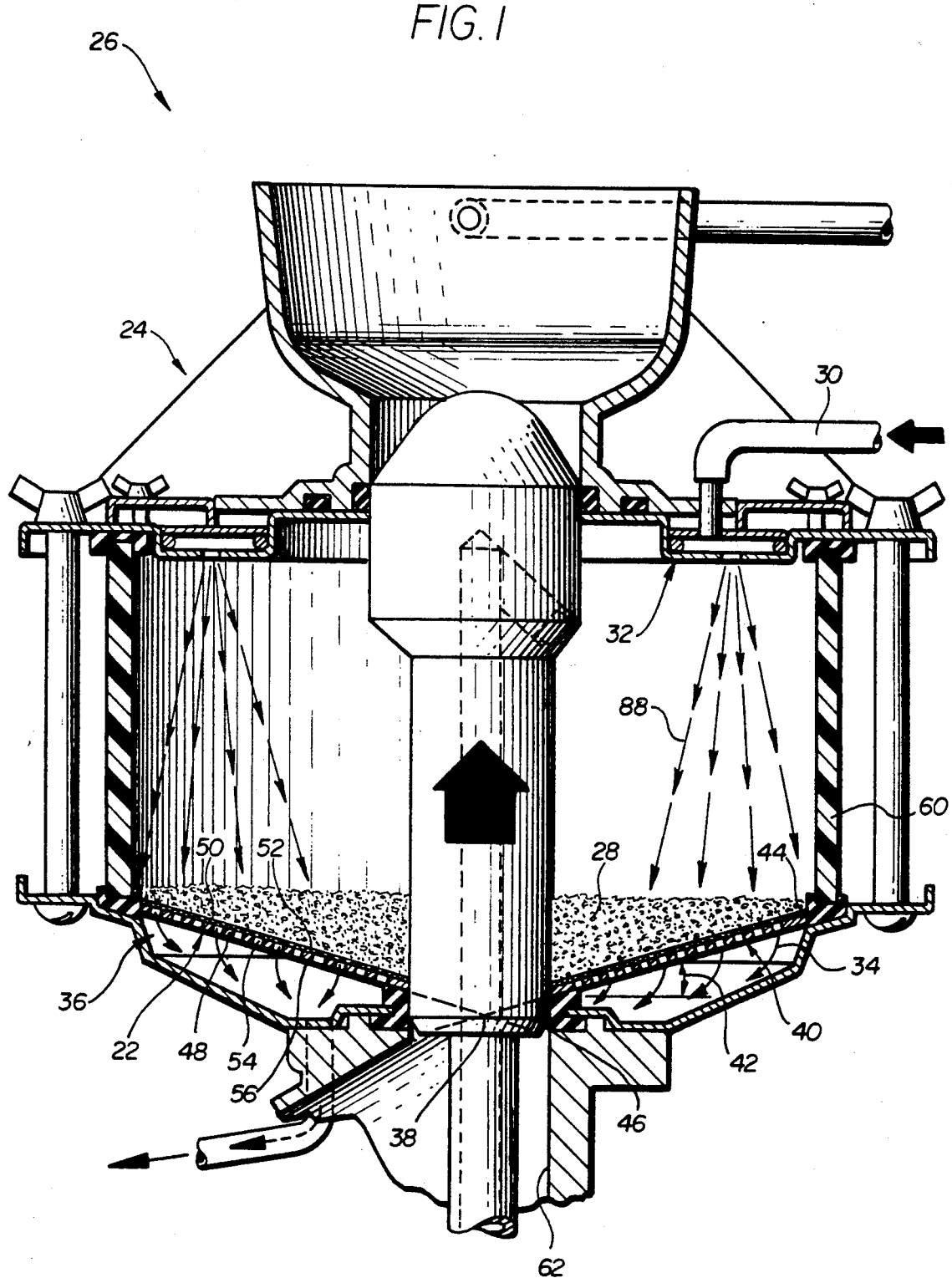
FIG. 1 is a partial fragmentary cross-sectional side elevational view of a brewing chamber of an automatic beverage brewing apparatus showing a multilayer reusable filter positioned in a bottom portion of the brewing chamber for retaining a brewing substance during a brewing cycle.

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein.

Referring now to the drawings, wherein like parts are designated by the same reference number throughout the figures, a multilayer reusable filter 22 in accordance with the present invention is shown in FIG. 1 in use in a brewing chamber 24 of an automatic beverage brewing apparatus 26. Two examples of automatic beverage brewing apparatus may be found in U.S. patent application Ser. No. 07/683,285 to Bunn et al. filed Mar. 26, 1992 and U.S. Pat. No. 07/818,850 to Bunn et al. filed Aug. 30, 1991 (a continuation of 07/683,285), which applications are both incorporated herein by reference.

While the entire apparatus 26 is not shown in FIG. 1, such an apparatus 26, for example as shown in both of the above referenced and incorporated U.S. patent applications, includes a device for dispensing a beverage brewing substance 28 into the brewing chamber 24 and a heated water reservoir to provide heated brewing water. Water is delivered to the brewing chamber 24 through a heated water fill line 30 to a brew water manifold 32 to infuse the beverage brewing substance 28 retained on the filter 22 to extract a brewed beverage 34.

As shown in FIG. 1, the filter 22 is shown as a frustoconically shaped body 36. The frustoconically shaped body 36 has a virtual apex 38 as shown by the extension of the downwardly angled or sloped sides 40 of the filter 22. The sides 40 have a funnel angle 42 of approximately 15°. The filter 22 has a base mouth 44 formed at the large end of the frustoconically shaped body 36 and an apex mouth or piston aperture 46 formed at the small end of the frustoconically shaped body 36.

The cross-sectional side elevational view of FIG. 1 shows the structure of the multilayer reusable filter 22. The filter 22 includes a foraminous support layer 48 and a porous mesh layer 50 which overlies the support layer 48. The mesh layer 50 is attached to an inside surface 52 of the frustoconically shaped body 36. A multiplicity of holes or bores 54 are formed extending from the top or inside surface 52 through the support layer 48 to a bottom or outside surface 56 of the support layer 48. The mesh layer 50, as shown in FIGS. 3-6, is formed of a woven material which defines openings or pores 58 between neighboring threads of the weave. It should be noted that other materials may be used for the mesh layer 50 such as an etched material whereby an etching process is used to form openings through a thin layer of material, as well as a deposition material where a desired material is deposited on an underlying substrate.

The filter 22 as shown in FIG. 1 is shown with downwardly sloped angled sides 40 which slope from a side 60 of the brew chamber 24 down towards a drain 62 of the brewing apparatus. In the type of apparatus 26 as shown in FIG. 1, it is desirable to promote movement towards the drain 62 in order to automatically clean the brew chamber 24 and the inside surface 52 of the filter 22 at the end of a brewing cycle. The filter 22, however, may be formed in a shape other than the frustoconically shaped body 36 of the present invention such that the alternative shape promotes movement towards the drain 62. As such, the filter 22 could be formed with a closed apex 38 such that a concaved, closed bottom structure is provided. Also, depending on the type of apparatus used and the orientation of a drain, the mesh layer 50 could be attached, or bonded, to the outside surface of a convex body such that the body slopes outwardly and downwardly from a central area.

Figure 2:
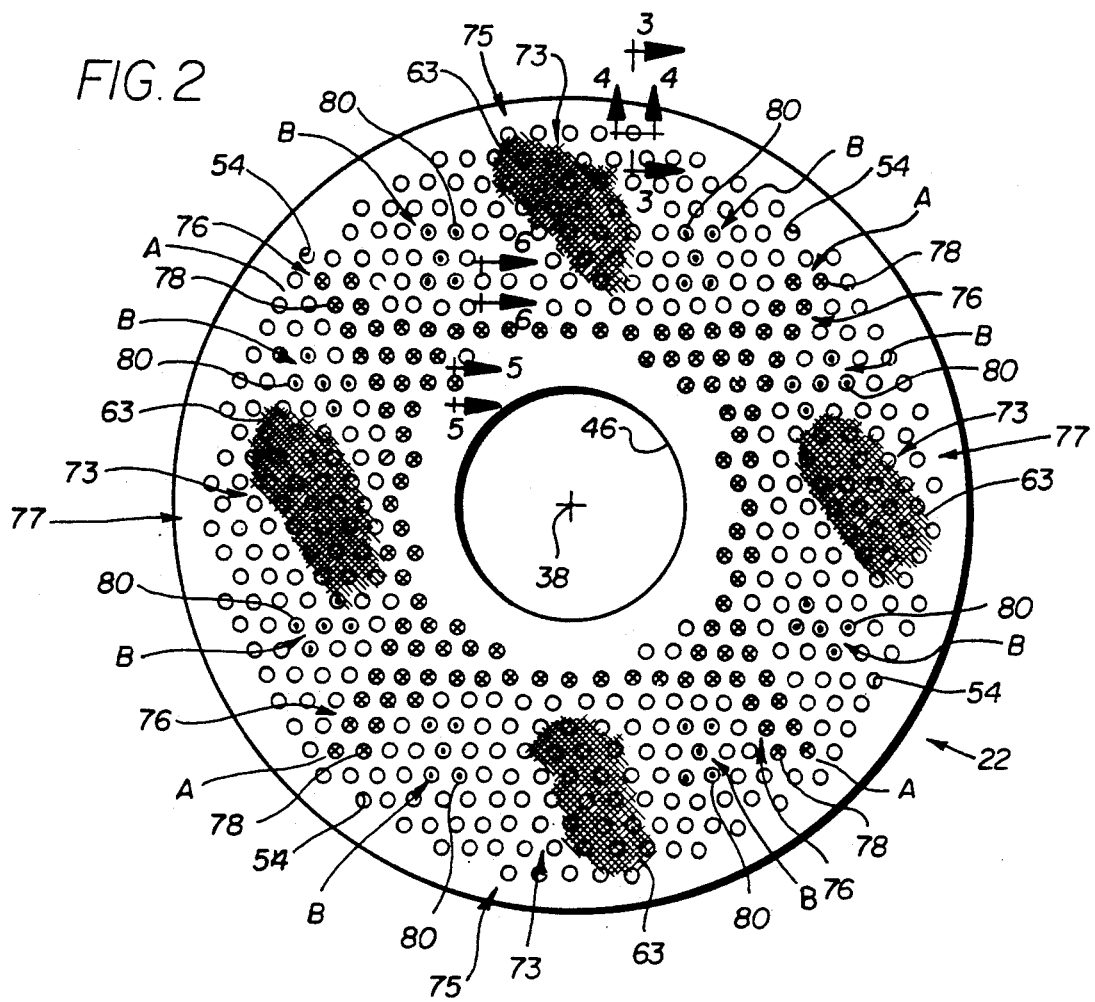
FIG. 2 is a top plan view of the multilayer reusable filter as shown in FIG. 1 which has been removed from the brewing chamber as shown in FIG. 1 and illustrates three general types of wrinkles which are formed in a mesh layer of the multilayer reusable filter.

With additional reference to FIGS. 2-6, the filter 22 is shown in a plan view as well as enlarged cross-sectional side views. The plan view as shown in FIG. 2 shows the multiplicity of holes 54 formed through the support structure 48 of the filter 22. The material used for the mesh layer 50 is an extremely fine mesh and as such is not provided with great detail in FIG. 2. Therefore, the fine mesh is represented generally by the shaded areas 63 shown at spaced apart locations in FIG. 2 and has not been reproduced throughout FIG. 2 in the interest of clarity of the description.

One type of mesh material which may be used for the mesh layer 50 is a woven material formed with stainless steel threads. The material is approximately 0.0018 inches thick and has 333 threads woven in each direction per inch. The threads are spaced 0.003 inches apart resulting in openings 58 which are 45 microns wide. The holes 54 in the support layer 48 have a diameter of approximately 0.125 inches. With reference to FIGS. 3-6, many openings 5 the mesh layer 50 overlie or are coincident with each hole 54 in the support layer 48. The ratio of openings 58 to holes 54 allows the mesh layer 50 to retain a substantial portion of the particulate matter which has a dimension greater than 45 microns (the size of the openings 58) while the enlarged size of the holes 54 allows free passage of the resulting brewed beverage.

In accordance with the present invention, wrinkles or dimples 64 are shown in the enlarged cross-sectional side views in FIGS. 3-6 are formed within a perimeter 65 of the hole 54. Each wrinkle 64 traverses a hole 54. The wrinkles 64 increase the effective surface area of the mesh layer 50 of the filter 22. It is important that the mesh layer 50 overlying the support layer 48 forms wrinkles 64 within the perimeter 65 of the holes 54 of the support layer 48 (see FIGS. 3-6) to promote passage of brewed beverage from the brewing substance 28 through the filter 22. The increased surface area of the filter 22 is discussed in greater detail hereinbelow.

Figure 3:
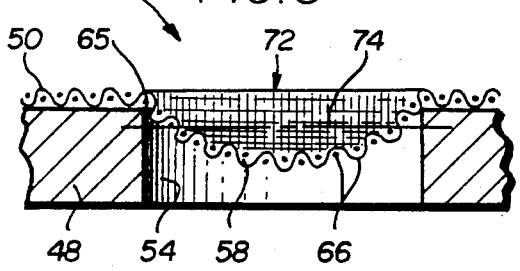
FIG. 3 is a cross-sectional view of the multilayer reusable filter taken along lines 3—3 in FIG. 2 showing a longitudinal view of a wrinkle formed within a perimeter of a hole of a support layer of the filter.
Figure 5:
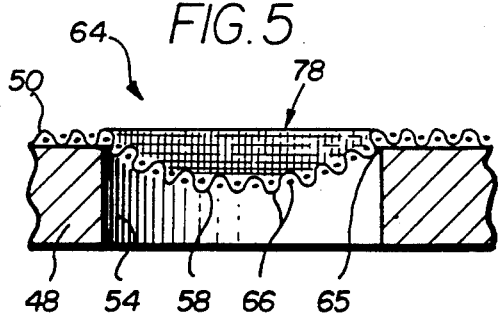
FIG. 5 is a lateral view of a wrinkle taken along line 5—5 in FIG. 2 and identified with an "X" mark placed over the hole for reference purposes.
Figure 4:
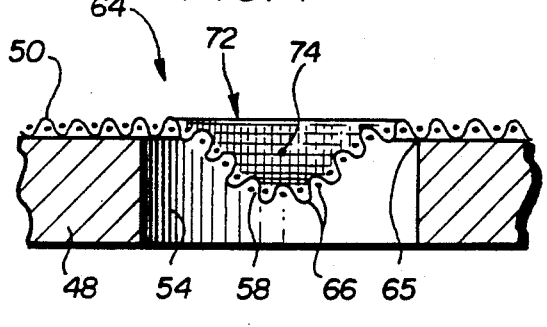
FIG. 4 is a transverse cross-sectional view taken along lines 4—4 in FIG. 2 of the wrinkle formed within the perimeter of the hole as shown in FIG. 3.
Figure 6:
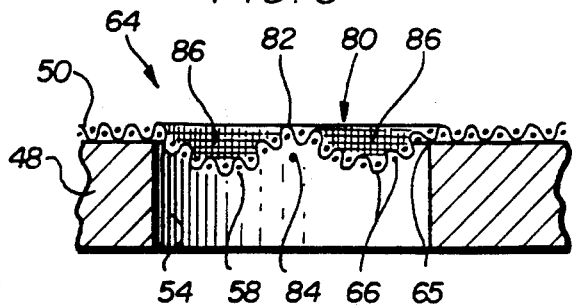
FIG. 6 is a transverse view of a wrinkle taken along lines 6—6 as shown in FIG. 2 which has a ridge formed in the wrinkle and is identified with a "." mark placed inside the hole for reference purposes.

As shown in FIG. 2, the mesh layer 50 has a bi-directional orientation defined by the periodic spacing of the openings 58 in the mesh material 50. The bi-directional orientation is common among materials with periodically spaced openings regardless of the shape of the openings and the process used to form the openings 58. As such, the directional orientation is common to woven, etched, as well as deposited mesh materials. FIGS. 3 and 4 reflect a linearly oriented furrow 72 type wrinkle 64 which is formed in an area grouped in four wrinkle areas 73 approximating quadrants on the filter 22.

With reference to FIGS. 3 and 4, the furrow 72 is linearly oriented along a wrinkle axis 74. The longitudinal cross-section as shown in FIG. 3 shows a concave portion of the mesh layer 50 extending inwardly from the perimeter 65 of the hole 54 downwardly into the hole 54. Similarly, the transverse view of the furrow 72 as shown in FIG. 4 shows the mesh layer 50 extending from the perimeter 65 into the hole 54. The wrinkle axes 74 of each of the furrows 72 is generally oriented downwardly along the side 40 of the filter 22 and generally paralleling the axes 74 of the other wrinkles 64 with in the respective one of the four wrinkle areas 73. This downward orientation of the furrow axes 74 promotes clearing of the furrows 72 when the brewing substance 28 is removed from the brewing chamber 24. Additionally, the wrinkle axes 74 of the wrinkles 64 in opposed pairs 75, 75 and 77, 77 of the four wrinkle areas 73 shown in FIG. 2 are generally parallelly oriented and aligned.

In areas (indicated generally by "A") surrounding the apex mouth 46 and extending in arms 76 positioned between the four furrow areas 73, are generally symmetrically concave depression 78 type wrinkles 64. As shown in the enlarged cross sectional view of FIG. 5, the symmetrically concave depressions 78 are further identified by the "X" marks placed over the holes 54 in the supporting layer 48 shown in FIG. 2. As the generally symmetrically concave depressions 78 are formed in the mesh material 50 along the sloped side 40 of the filter, any brewing substance which may have been lying in the depression 78 during a brewing cycle freely flows therefrom when the brewing substance 28 is removed from the brewing chamber 24.

In areas (indicated generally by "B") positioned generally on each side of the four furrow areas 73 and on either side of the arms 76 are ridged 80 type wrinkles 64. As shown in the enlarged cross sectional view of FIG. 6, the ridged wrinkles 80 are further identified by the "." placed the holes 54 in the supporting layer 48. Ridges 82 formed in the perimeter 65 of the holes 54 are generally linearly oriented in the manner as discussed with reference to the furrows 72. The ridged wrinkles 80 are oriented along a ridge axis 84 which is directed downwardly along the sloped side 40 of the filter 22. As the ridged wrinkles 80 are formed in the mesh material 50 along the sloped side 40 of the filter, any brewing substance which may have been lying in recesses 86 on either side of the ridge 82 freely flows therefrom when the brewing substance 28 is removed from the brewing chamber 24.

The filter 22 of the present invention is formed by a unique and non-obvious method. The method of forming the filter 22 is initiated by providing a suitably rigid material for the support layer 48 and a suitably flexible, porous material for the mesh layer 50. A multiplicity of holes 54 are formed through the support layer 48 to provide openings to allow fluid to flow through the filter 22. The mesh layer 50 is attached or bonded to one side of the support layer 48. The support layer 48, with the mesh layer 50 bonded thereto, is deformed to produce a concave or frustoconically shaped body 36. In the filter 22 as shown in FIGS. 1 and 2 the frustoconically shaped body 36 has a hole or mouth 46 formed therein. The wrinkles 64, as described hereinabove in greater detail, are formed when the mesh layer 50 and the support layer 48 to which it is attached is deformed into a concave shaped body 36. During the forming process the wrinkles 64 are formed within the perimeter 65 of the holes 54 by flexing and displacement of the mesh layer 50 into the holes 54 of the support layer 48.

In use, the filter 22 of the present invention is placed in a brew chamber 24 of an appropriate beverage brewing apparatus 26. Beverage brewing substance 28 is disposed in the brew chamber 24 on top of the filter 22 contacting the mesh layer 50. The dimensions of the openings 58 of the mesh layer 50 are such that a selected beverage brewing substance 28 will not become lodged therein during a beverage brewing process. A suitable heated liquid 88 is introduced through a heated fill line 30 by way of a brewing manifold 32 to infuse the beverage brewing substance 28 and produce a desired brewed beverage 34. The heated infusing liquid 88 flows through the beverage brewing substance 28 and through the openings 58 in the mesh layer 50 and subsequently flows through the holes 54 formed in the support layer 48.

At the end of the brewing process, the filter 22 is rinsed clean of the spent beverage brewing substance 28. The orientation and formation of the wrinkles 64 do not retain beverage brewing substance during the cleaning process and, as such, assures that the filter 22 will be reusable and easily cleanable over numerous beverage brewing cycles.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A reusable multilayer filter for use with a beverage brewing apparatus, said multilayer filter comprising:
   a frustoconical foraminous support layer having an inside surface and an outside surface and a multiplicity of spaced apart bores extending therethrough;
   a porous mesh layer attached to said inside surface of said frustoconical foraminous support layer, said porous mesh layer having a multiplicity of pores extending from a first side of said mesh layer therethrough to a second side of said mesh layer, said pores in said porous mesh layer having a smaller diameter than said bores in said frustoconical foraminous support layer for retaining material having dimensions larger than the diameter of said pores
   a multiplicity of dimples in said porous mesh layer, each said dimples being disposed within a corresponding area defined on said inside surface of said frustoconical foraminous support layer by a perimeter of a corresponding one of said bores of said foraminous support layer, said dimples projecting into said corresponding one of said bores, said dimples increasing the effective internal surface area of said reusable multilayer filter.

2. A multilayer filter as recited in claim 1, wherein said mesh layer is attached to said inside surface of said frustoconical foraminous support layer in areas surrounding said perimeter of said bores in said frustoconical foraminous support layer.

3. A multilayer filter as recited in claim 1, wherein said multilayer filter is frustoconically shaped having downwardly sloped sides.

4. A multilayer filter as recited in claim 3, further including a dimple axis associated with each dimple, each of said dimple axes being oriented generally downwardly relative to sides of said multilayer filter.

5. A multilayer filter as recited in claim 1, further including:
   downwardly angled sides of said filter being defined by said mesh layer and said support layer;
   a dimple axis associated with each dimple, each of said dimple axes being oriented generally downwardly relative to said sides of said frustoconically shaped filter;
   dimple areas being defined at spaced apart positions on said filter, said dimple axes of said dimples in said dimple areas being generally aligned in a parallel orientation along said sides of said filter.

6. A multilayer filter as recited in claim 5, wherein four dimple areas are defined on said filter, said dimple axes of said dimples in diametrically opposed pairs of said four dimple areas being generally parallelly aligned.

7. A multilayer filter as recited in claim 1, wherein said porous mesh layer is attached to said frustoconical foraminous support layer, said multilayer filter defining a frustoconically shaped body with said porous mesh layer being disposed on an inside surface of said frustoconically shaped body, said dimples defining furrows directed inwardly from said perimeter of said bores on said inside surface of said foraminous support layer, said furrows extending into said bores of said foraminous support layer.

8. A reusable multilayer filter for use with a beverage brewing apparatus, said multilayer filter comprising:
- a frustoconically shaped foraminous support layer, said foraminous support layer having an inside surface, an outside surface and a multiplicity of spaced apart bores extending from said inside surface to said outside surface;
- a porous mesh layer overlying said inside surface of said frustoconicaly shaped foraminous support layer, said porous mesh layer being attached to said foraminous support layer in areas surrounding said bores, said foraminous support layer having a multiplicity of pores extending therethrough, said pores in said porous mesh layer having a smaller diameter than said bores in said foraminous support layer for retaining materials having dimensions larger than said pores; and
- a multiplicity of dimples in said porous mesh layer, each of said dimples being disposed within a corresponding area defined by a perimeter of a corresponding one of said bores of said foraminous layer, said dimples projecting inwardly into said bores of said foraminous support layer for increasing the effective internal surface area of said multilayer filter.

9. A method of forming a reusable multilayer filter for use with a beverage brewing apparatus, said method comprising the steps of:
- providing a support layer and a mesh layer;
- forming a multiplicity of spaced part bores through said support layer;
- positioning said mesh layer over said support layer;
- attaching said mesh layer to one side of said support layer;
- deforming said support layer and attached mesh layer for forming a concave body of a desired filter shape with said mesh layer attached to an inside surface of said support layer and for forming dimples in said mesh material in areas defined by a perimeter of said spaced apart bores, said dimples effectively increasing the internal surface area of said concave multilayer filter.

10. A method of forming a concave multilayer filter as recited in claim 9, further including the step of forming said filter in a frustoconical shape, said filter having a base mouth and an apex mouth.

11. A filter formed in accordance with the method of claim 9.

12. A filter formed in accordance with the method of claim 10.

* * * * *